(12) United States Patent
Moody (10) Patent No.: US 7,217,446 B2
(45) Date of Patent: May 15, 2007

(54) DECORATIVE WREATH

(76) Inventor: Dorcas Moody, P.O. Box 1972, Davidson, NC (US) 28036

( * ) Notice: Subject to any disclaimer, the term of this patent is extended or adjusted under 35 U.S.C. 154(b) by 0 days.

(21) Appl. No.: 11/081,372

(22) Filed: Mar. 16, 2005

(65) Prior Publication Data

US 2006/0210728 A1 Sep. 21, 2006

(51) Int. Cl.
 *G09F 17/00* (2006.01)
(52) U.S. Cl. ............................. 428/10; 428/7
(58) Field of Classification Search .............. 428/3, 428/10, 19, 23, 24, 27, 542.2; 362/565, 567, 362/568, 122; D11/117, 118, 119, 120, 121, D11/122, 123, 124, 125, 126, 127, 128, 129, D11/130, 130.1
See application file for complete search history.

(56) References Cited

U.S. PATENT DOCUMENTS

| | | | |
|---|---|---|---|
| 1,611,589 A | 12/1926 | Janusek | |
| 1,631,631 A | 6/1927 | Gerlinger | |
| 1,657,750 A * | 1/1928 | Hanson et al. | ................. 428/10 |
| 1,772,357 A * | 8/1930 | Manson | ........................ 428/10 |
| 2,509,748 A * | 5/1950 | Slavek | .......................... 66/170 |
| 3,141,808 A | 7/1964 | Wellens | |
| 3,302,327 A * | 2/1967 | Fant | ........................... 47/41.12 |
| 3,526,992 A | 9/1970 | Foster | |
| 3,591,442 A | 7/1971 | Matesi | |
| 3,819,458 A * | 6/1974 | Kinderman et al. | ........... 428/10 |
| 4,364,102 A * | 12/1982 | Huppert et al. | .............. 362/123 |
| 5,110,635 A | 5/1992 | Creegan | |
| 5,497,577 A * | 3/1996 | Carpenter | ................... 47/41.12 |
| 5,607,130 A * | 3/1997 | Smay et al. | .............. 248/125.3 |
| 6,017,132 A * | 1/2000 | Miller et al. | ................. 362/252 |
| 6,237,882 B1 * | 5/2001 | DiMuzio | ..................... 248/175 |

* cited by examiner

*Primary Examiner*—Jennifer McNeil
*Assistant Examiner*—Gordon R. Baldwin
(74) *Attorney, Agent, or Firm*—Alston & Bird LLP (57) ABSTRACT

In general, the invention is a circular wreath having a solid base with holes extending therethrough so that decorative ornaments can be attached to the wreath and easily released at a later time. In the preferred embodiment, tubes extend through the holes in order to guide and support the decorative ornaments. In this way, the wreath can be used continuously throughout the year simply by changing the decorative ornaments (e.g., seasonally-themed floral bouquets, colored ribbons, emotive signs, etc.) adorning the wreath to suit any particular event or occasion.

11 Claims, 9 Drawing Sheets

DECORATIVE WREATH

BACKGROUND OF THE INVENTION

1. Field of the Invention

The present invention relates to a decorative wreath. More particularly, this invention relates to a wreath having a solid base and removable seasonal ornaments.

2. Description of Related Art

Wreaths have been used as decorations for centuries. In ancient times, wreaths were a symbol of power or victory and were most notably worn by Olympic victors and emperors of the time. In the fifteenth century, working class citizens began wearing wreaths to honor religious holidays and mark special occasions.

In modern times, wreaths are most often associated with Christmas. Many Americans place wreaths in the windows of their houses or on their doors as a Christmas decoration. Wreaths are also be used on other occasions, such as Halloween, Easter, and weddings. However, most wreaths are made of plant material and are not reusable. They are typically used for one holiday or event and then discarded. Thus, if a person wants to display wreaths several times throughout the year, they would need multiple wreaths. Obtaining new wreaths is costly and wasteful, and it discourages people from using wreaths as much as they otherwise would.

U.S. Pat. No. 1,611,589 to Janusek relates to a wreath having a base made up of two trough-like members that are preferably sheet metal and that are put together to form the circular base of the wreath. The core halves are separable for insertion of decorative pieces so that the size and shape of the wreath can be varied. The base has perforations in which flowers can be inserted and anchored. Wires are used to brace the pieces of the hollow wreath core. This wreath is made of sheet metal and is hollow.

U.S. Pat. No. 3,591,442 to Matesi discloses an artificial wreath having a semi-toroidal shaped base and a plurality of apertures or holes used for removably mounting decorative greenery, figurines or letters. The attaching means can be wire or a knobbed plastic binding. The wreath is not a closed ring. Instead, it resembles a bicycle tire chopped in half at the top, which is supposed to help the decorations stay on the wreath. The wreath does not have a back, so it can hang flat against a door. The wreath is not a full ring and can be decorated only on one side, which inhibits its usefulness and versatility.

U.S. Pat. No. 5,110,635 to Creegan discloses a solid ring-shaped wreath that permits attachment and detachment of accessories associated with different seasons or events. The outside of the wreath is wrapped with one portion of a Velcro® fastener. The accessories have the other half of the Velcro® fastener on one side, thereby allowing their easy detachment to the outside of the wreath.

U.S. Pat. No. 6,237,882 to DiMuzio discloses a decorative display for displaying flowers, fruit, candles, ribbons, pine cones, or any other item that may be attached by means of a pin, corkscrew, couplet, or skewer. Importantly, the invention is made of a wire frame comprised of "a plurality of longitudinal and latitudinal arcuate members." Mounted on the support structure at regularly spaced intervals are a plurality of attachments adapted to releasably retain outwardly extending protrusions. In the preferred embodiment, the attachment means are threaded nuts, but the protrusions may also be engaged by a compression fit, a locking mechanism, or by a hook mechanism. The length and shape of the protrusions are dictated by the decorative elements to be mounted thereon.

Accordingly, it is an object of the present invention to provide a wreath that is able to be used many times in different environments due to its versatility and durability. Another object of the invention is to provide a wreath having a solid base and removable seasonal ornaments.

It is also an object of the invention to provide a method for making such wreaths.

BRIEF SUMMARY OF THE INVENTION

In general, the invention is a wreath having a solid base with holes extending therethrough so that decorative ornaments can be attached to the wreath and easily released at a later time. In the preferred embodiment, tubes extend through the holes in order to guide and support the decorative ornaments. In this way, the wreath, which is preferably generally circular, can be used continuously throughout the year simply by changing the decorative ornaments (e.g., seasonally-themed floral bouquets, colored ribbons, emotive signs, etc.) adorning the wreath to suit any particular event or occasion.

More specifically, the invention is a decorative wreath comprising a solid base having a plurality of holes extending through the surface of the base through which decorative ornaments are releasably secured to the wreath. The invention also encompasses a method of making the wreath comprising the steps of providing a solid ringed base, inserting hollow tubes extending through the ringed base, inserting rods having decorative ornaments into the hollow tubes, and releasably securing the decorative ornaments to the wreath using fasteners. The plastic tubing maintains the integrity of the hole and the straw wreath and more easily allows the user to insert seasonal ornamentation through the hole and attach the ornamentation to the wreath and easily remove it.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
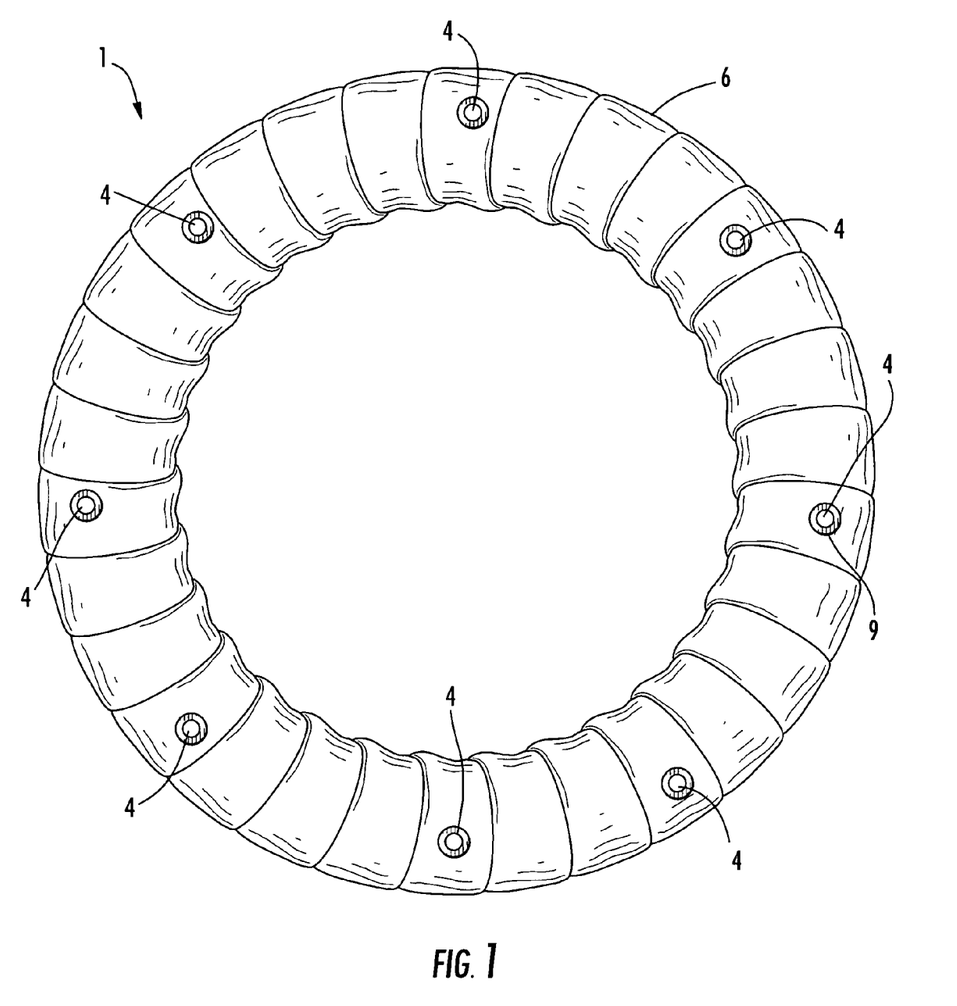
FIG. 1 is a plan front view of the wreath of the present invention without ornamentation.

FIG. 1 shows a wreath wrapped in material 6 and having a plurality of holes 2 therethrough the solid base 2 of the wreath 1 without any decorations. The base 2 can be materials typically used for making wreaths, such as straw wrapped with wire to maintain its structure, Styrofoam, other plastics, or wood composite. The material must be strong enough to maintain its structural integrity when holes for positioning decorative ornaments are placed through the base. A plurality of holes 4 are spaced intermittently on the base 2. In this embodiment, the base 2 is wrapped in weather-resistant ribbon 6, which curls around the outside of the base 2. The weather-resistant ribbon 6 preferably comprises any plastic material that 6 makes the wreath more durable and allows it to be used outside under all weather conditions. It also increases the number of times and frequency with which the wreath can be used.

Figure 2:
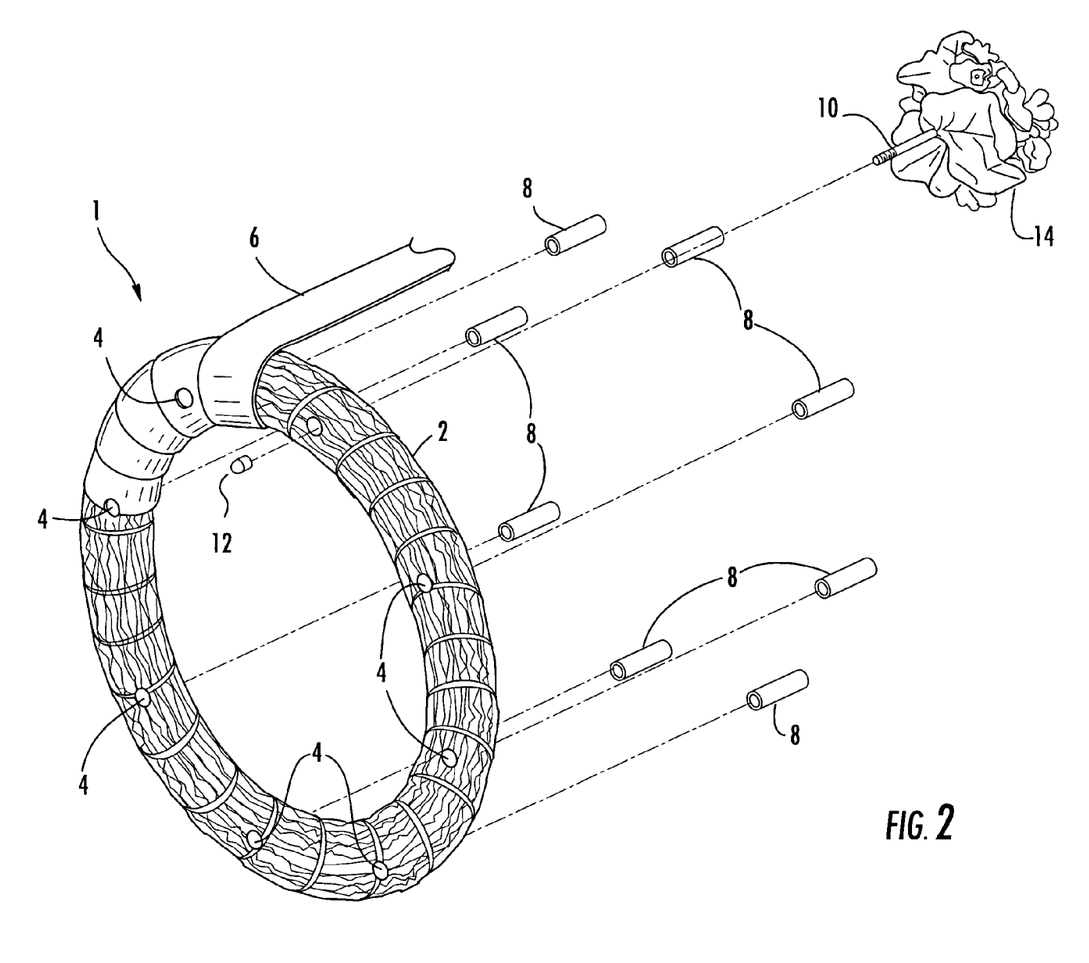
FIG. 2 is an exploded perspective view of a preferred embodiment of the wreath of the present invention.

FIG. 2 shows a preferred embodiment with the components used to create the wreath. The hollow tubes 8 are inserted into the plurality of holes 4, and the rods 10, one of which is shown, are inserted into the tubes 8. In the preferred embodiment, the rods 10 extend through the base 2 and are releasably secured to the base 2 by fasteners 12. In an alternative embodiment, the rods 10 are frictionally fitted in the tubes 8 and held snugly in place so that no exterior fasteners are needed. The decorative ornament 14, one of which is shown in FIG. 2 as a type of flower, is preferably permanently attached to a rod 10 and inserted through a tube 8 where it is fastened to the base 2. In another embodiment of the invention, the decorative ornament 14 is releasably secured to a rod 10 so that rods of different styles or lengths can be used with different decorative ornaments 14.

In the preferred embodiment of the invention, the tubes 8 are already secured to the base 2 when the end user obtains the wreath. The rods 10 can be inserted into the tubes 8 and removed as needed in order to change the decorative ornaments 14 according to the season or special occasion.

Figure 4:
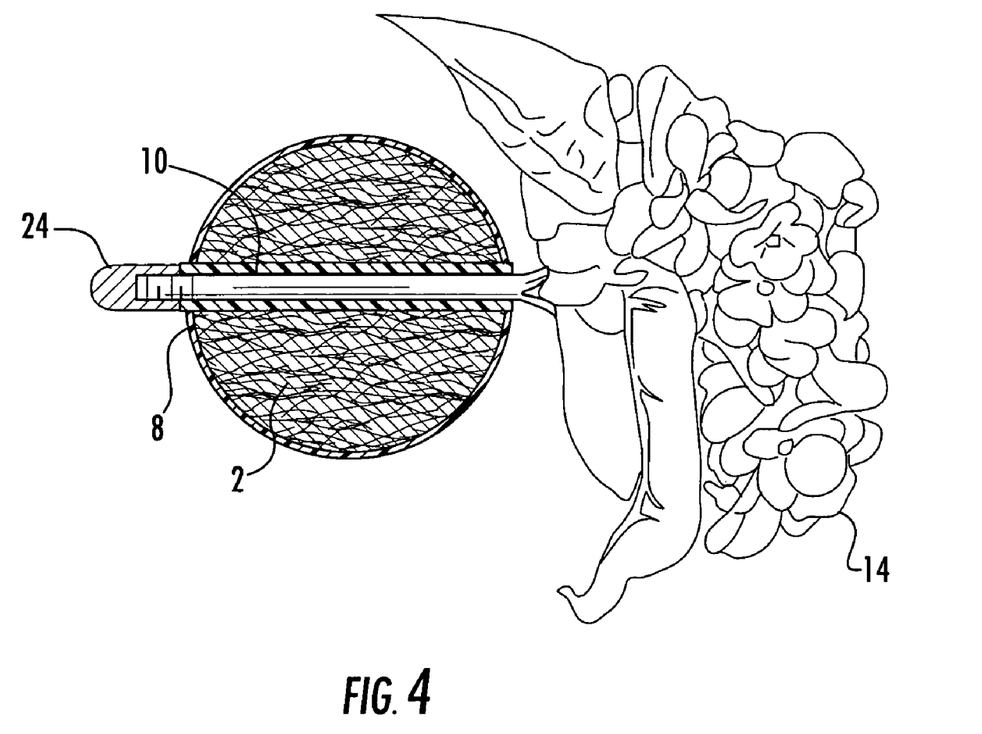
FIG. 4 shows a cross-section of the wreath with a decorative attachment affixed to the core.

FIG. 4 shows an enlarged cross-section of the components of the wreath. The decorative ornaments 14 of the invention are on rods 10 secured by fasteners. The tubes 8 are placed in the walls of the holes 4 before the rods 10 are inserted. As shown in FIG. 2, the tube 8 has a lip 9 (best seen in FIG. 1) encircling one end, which keeps the tube from sliding through the hole. The lip 9 can be any material, such as a plastic or metal, that fits on the tube 8 and prevents it from moving. In an alternative embodiment of the invention, the rods 10 are inserted directly into the holes 4, and tubes 8 are not used. The base 2 of the wreath 1 in FIG. 4 is wood, but it can also be a solid plastic, Styrofoam, straw, or another suitable material. The decorative ornament 14 of FIG. 4 is a large flower, but decorative ornaments of many shapes and sizes can be used, including those that spell a phrase, such as "Happy Birthday!" The rod 10 extends out the back of the wreath where it is releasably secured by a fastener. The fastener 24 of the wreath in FIG. 4, similar to fastener 12 shown in FIG. 1, is a cap mechanism, but a coupling, pin, or a threaded screw and nut combination. Other suitable fasteners could also be used. In another embodiment of the invention, the rods fit snugly in the tubes such that no fasteners are needed.

The rod 10 and fastener 24 do not inhibit the ability of the wreath to hang flat against a door, but if the user does not wish to put the wreath 1 on a door, decorative ornaments 14 can be hung on opposite sides of the wreath at the same time. In this way, the wreath is aesthetically pleasing from the front and the back and can be hung from above or supported from below without detracting from its utility.

Figure 3:
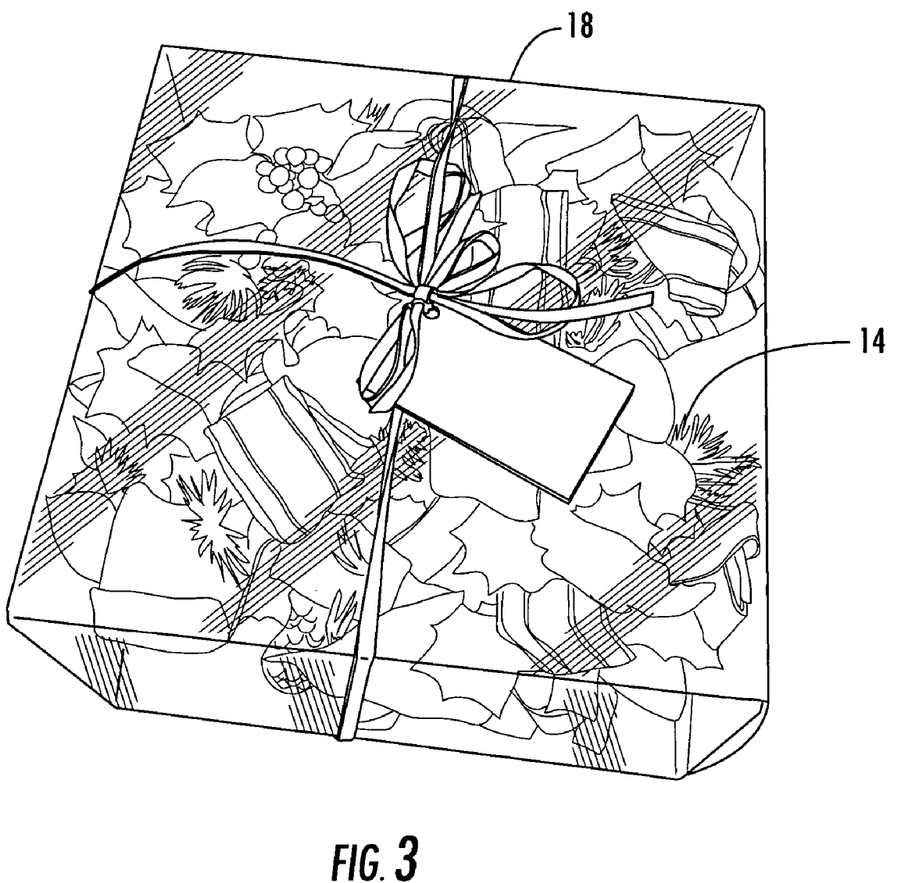
FIG. 3 is a view of the decorative ornaments in a package such as one used in a retail shop.

The solid base 2 of the invention can be purchased by itself or bought along with decorative ornaments 14. Decorative ornaments 14 can also be sold separately in stores as shown in FIG. 3. The box 18 shown in FIG. 3 contains only decorative ornaments 14, but a larger box containing a fully assembled wreath is also within the bounds of the invention. A person purchasing the decorative ornaments 14 shown in the box 18 would probably want to use them for the Christmas season since they contain evergreen leaves and berries and otherwise typify the type of decorations used during that period. Although the preferred option is to buy artificial decorations to place on the wreath, live materials may also be used.

Figure 6:
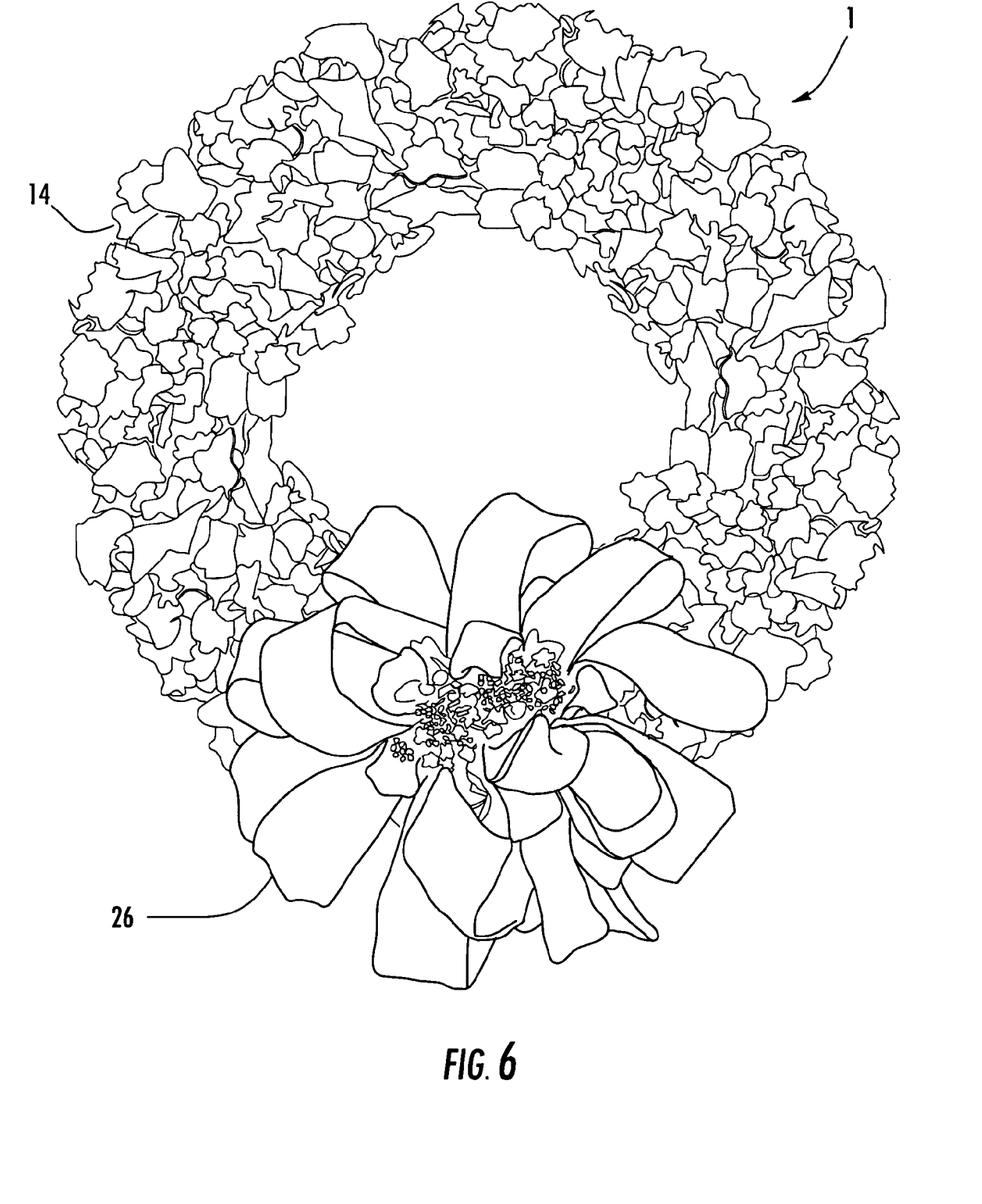
FIG. 6 is a plan front view of a wreath having wedding decorations.
Figure 7:
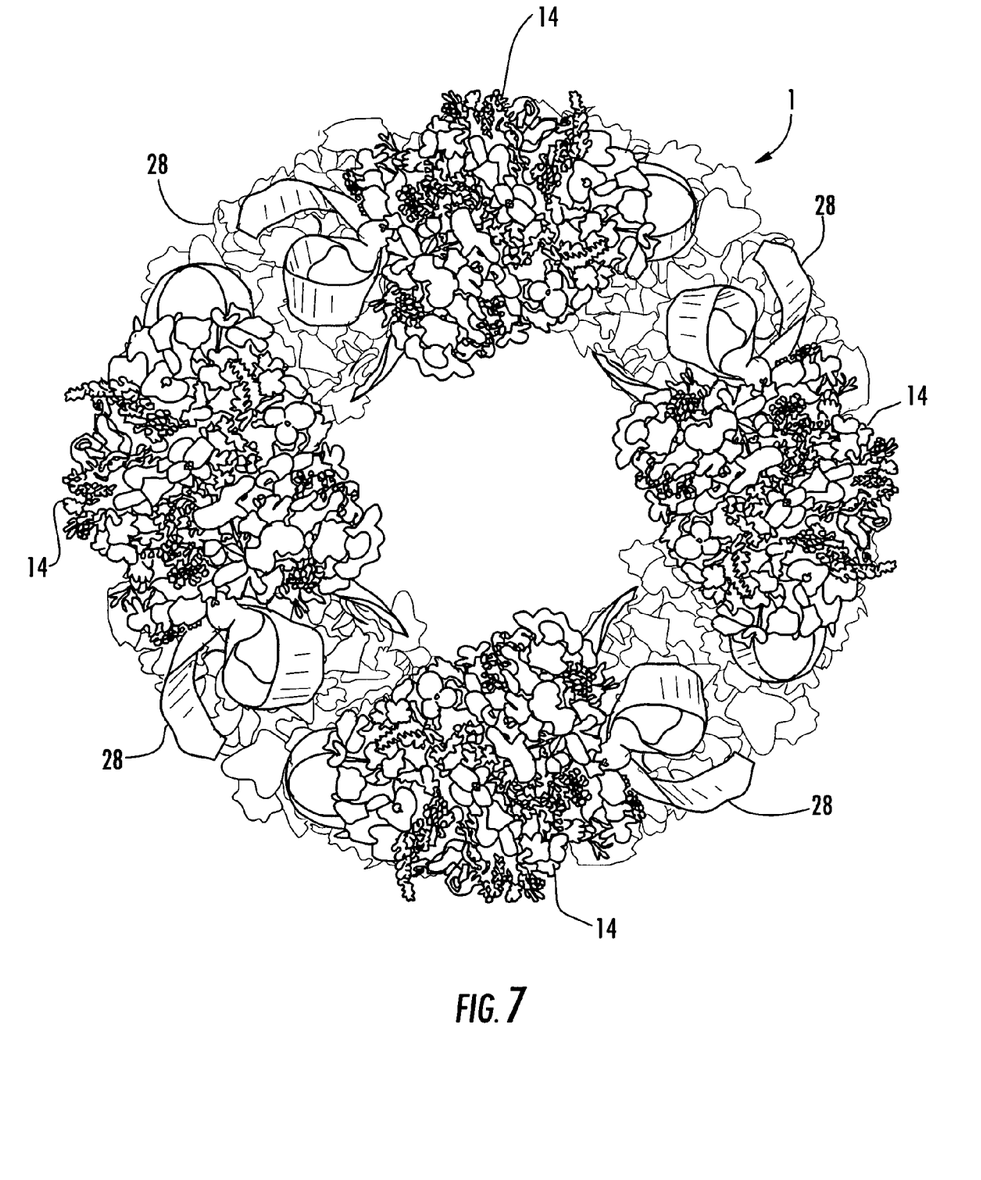
FIG. 7 is a plan front view of a wreath having springtime decorations.
Figure 8:
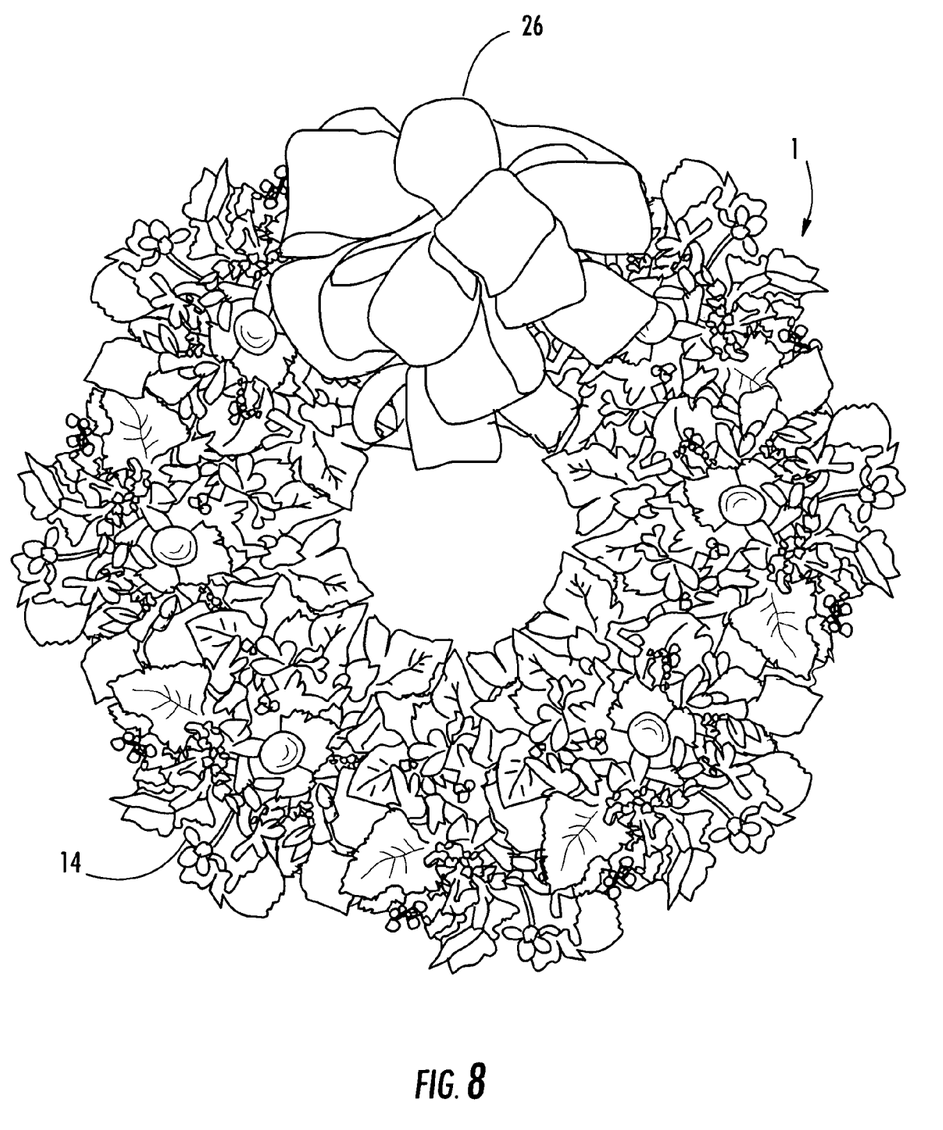
FIG. 8 is a plan view of a wreath having fall decorations.
Figure 9:
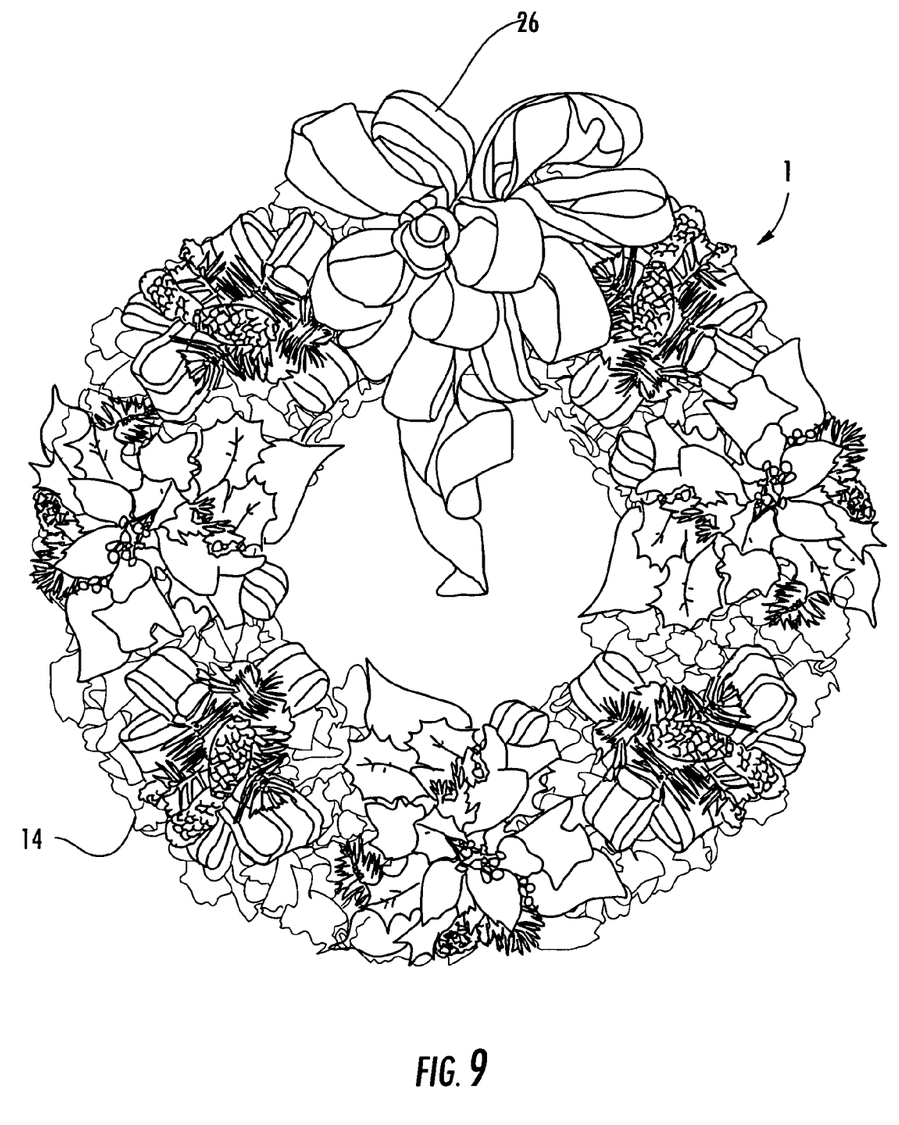
FIG. 9 is a plan view of a wreath having Christmas decorations.

Once a person purchases a solid base 2, they can buy many different decorative ornaments 14 to be used on different occasions. For example, FIG. 6 shows the wreath 1 of the invention decorated with a single bow 26 and ornaments 14, which could be used at a wedding reception. The wreath 1 of FIG. 7 is covered in flowers 14 and frilly bows 28 and could be displayed in the spring. Similarly, the wreaths of FIG. 8 and FIG. 9 represent fall and Christmas decorations, respectively. The user would purchase the decorative ornaments 14 for these occasions, but the same circular base could be used for quite some time.

Figure 5:
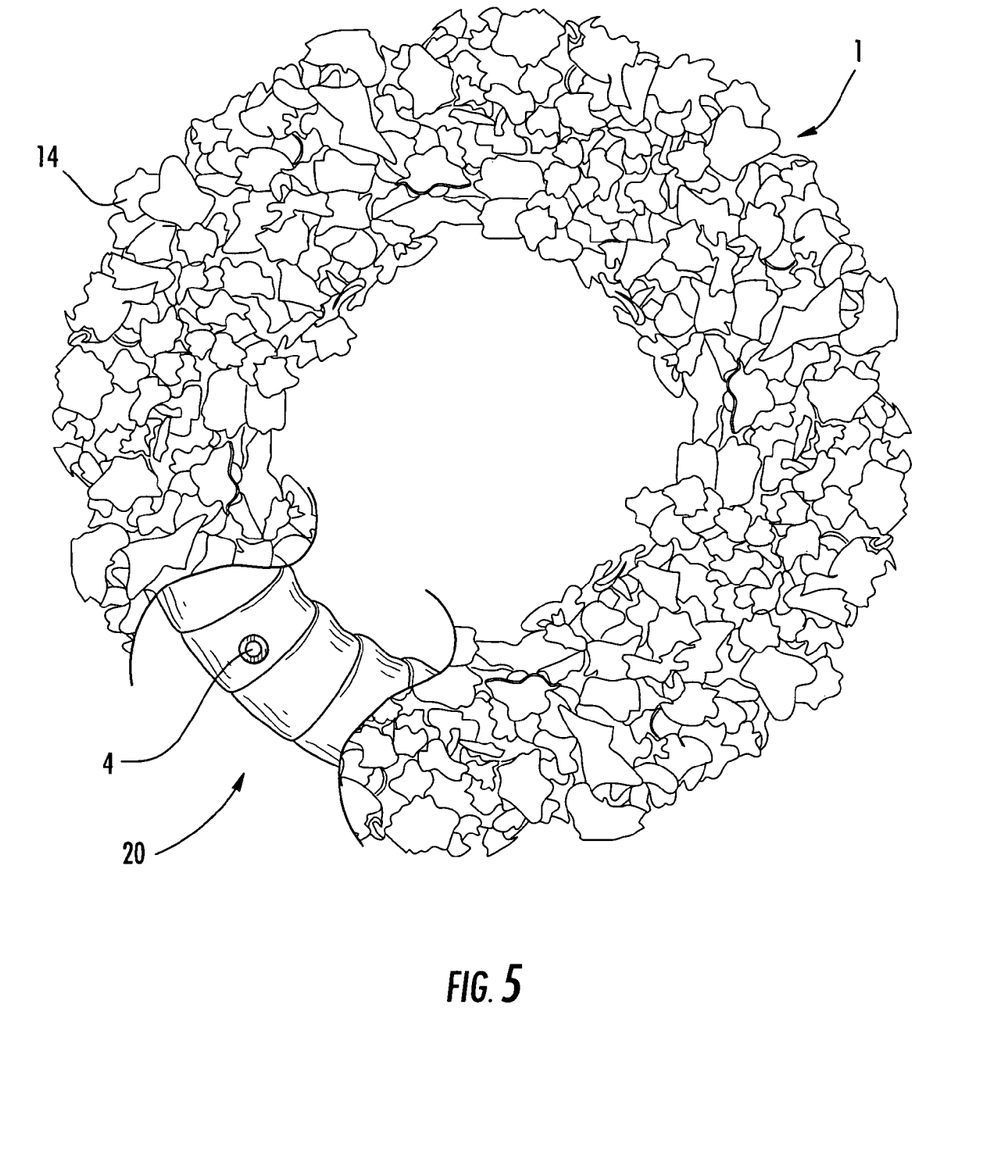
FIG. 5 is a plan front view of a decorated wreath with a section of the base uncovered.

The uncovered portion 20 of the wreath in FIG. 5 shows the wreath in its typical state when it is not in use. In one embodiment of the invention, the weather-resistant ribbon 6 can be covered with foliage or other material, which serves as a background for the decorative ornaments 14. In another embodiment, the weather-resistant ribbon 6 is not wrapped in foliage or other material; instead, the decorative ornaments 14 include foliage that covers much of the wreath. The hole 4 of the uncovered portion 20 can be filled by a decorative ornament 14 of the user's choosing. The wreath of the invention allows the user to be very creative in the use of interchangeable decorative ornaments 14.

The invention is also directed to a method of making the wreath described above. The method comprises the steps of providing a solid ringed base, inserting hollow tubes extending through the ringed base, inserting rods having decorative ornaments into the hollow tubes, and releasably securing the decorative ornaments to the wreath. The method allows the user to conveniently modify a wreath with decorative ornaments that are appropriate for specific events or seasons.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A decorative wreath, comprising:
 a generally annular base encircling an axis, the base having an outer surface and having a thickness as measured in a direction parallel to the axis;
 a weather-resistant sheet material wrapped about the outer surface of the base so as to cover the outer surface;
 a plurality of circumferentially spaced holes defined through the weather-resistant sheet material and extending into the base, each hole extending in the direction parallel to the axis;

a plurality of tubes respectively disposed in said holes, each tube having a length, a major portion of the length of each tube being internally disposed in the base; and a plurality of decorative ornaments each having an attachment rod connected thereto for insertion into one of the tubes so as to attach each decorative ornament to the base.

2. The decorative wreath of claim 1, wherein substantially the entire length of each tube is disposed internally in the base.

3. The decorative wreath of claim 1 wherein said attachment rods and said tubes are of such diameters relative to each other that said attachment rods are frictionally fit into said tubes.

4. The decorative wreath of claim 1, wherein said attachment rods extend through said weather-resistant sheet material and base a sufficient distance to accommodate a fastener on each said attachment rod for releasably securing said decorative ornaments to said base.

5. The decorative wreath of claim 4, wherein said fastener comprises a threaded screw and nut combination.

6. The decorative wreath of claim 1, wherein each of said tubes has a lip encircling one end thereof.

7. The decorative wreath of claim 1, wherein said decorative ornaments comprise thematic decorations.

8. The decorative wreath of claim 1, wherein said base is made of wood.

9. The decorative wreath of claim 1, wherein said base is made of a plastic material.

10. The decorative wreath of claim 1, wherein said base is made of straw.

11. The decorative wreath of claim 1, wherein said base is made of Styrofoam.

* * * * *